Oct. 19, 1965   R. B. WALLACE   3,213,175
METHOD AND APPARATUS FOR MAKING A FRICTION NUT
Filed Jan. 23, 1963

INVENTOR.
RICHARD B. WALLACE
BY Whittemore, Hulbert
& Belknap
ATTORNEYS

United States Patent Office 3,213,175
Patented Oct. 19, 1965

3,213,175
METHOD AND APPARATUS FOR MAKING A FRICTION NUT
Richard B. Wallace, Bloomfield Hills, Mich., assignor to The Oakland Corporation, Birmingham, Mich., a corporation of Michigan
Filed Jan. 23, 1963, Ser. No. 253,437
22 Claims. (Cl. 264—320)

This invention relates to an apparatus and method of making a friction lock nut or fastening element and is a continuation-in-part application of my copending application entitled "Friction Nut and Method and Apparatus for Making The Same," United States Serial Number U.S. 155,134, filed November 27, 1961, and now abandoned. More particularly, this invention relates to an apparatus and a method for making a friction lock nut of the type comprising a member having a plug of deformable material therein which will present the same angle to the approaching end of a threaded screw or fastener independently of which side of the nut is used.

The prior art shows various arrangements of a lock nut utilizing a plug of deformable material. As an example, the Brutus Patent 2,520,122 discloses an arrangement in which the nylon plug is inserted into a recess provided in the nut which has an axis at about a 25° angle with respect to the axis of the nut. As a result one side of the plug extends into the threaded opening at about a 65° angle. With such a construction there is a tendency for the end of the mating threaded fastener to shear off the projecting portion of the plug. With the present invention the sides of the projecting portion of the plug make approximately a 45° angle so that a side of the plug will present the same angle to the approaching end of a fastener regardless of which side of the nut is first approached by the fastener.

The present invention has another important advantage over the prior art in that the plug completely fills the recess provided in the nut. As an example, in Brutus, a void is provided between the bottom of the plug, which is made from nylon, and the bottom of the recess. Also, in the Boots Patent 2,462,603, a radial hole is drilled from the outside of the nut into the threaded interior thereof. A nylon plug or pin which is provided with a head is inserted in the hole. The exterior surface of the nut is then staked, thereby holding the plug in the nut. The staking operation, however, does not completely cover the head of the nylon plug with the result that the plug is in communication with the outside of the nut. Regardless of whether the Brutus or the Boots threaded locking nut is utilized, in heat applications the nylon plug softens and migration of the nylon appears to be outwardly with respect to the axis of the nut, thus reducing the inward protrusion of the nylon plug and reducing the effectiveness of the plug. While Brutus has a nut provided with a blind recess as in the present invention, the advantage over Brutus as well as the Boots locking device is that migration of the nylon is directed only inwardly towards the axis of the nut. In both Brutus and Boots, the plug is subjected to migration under heat which occurs in a radial outwardly direction.

The friction lock nut according to the present invention is provided with a blind recess which is adapted to receive a plug of deformable material which completely fills the recess and which includes a portion extending outwardly from the open end of the recess a predetermined distance, said portion being adapted to engage and form a friction lock with a mating externally threaded member.

An object of the present invention is to provide an apparatus and a method for making a friction nut of the aforementioned type in which the end face of the plug facing the bore of the nut is approximately of concave cylindrical formation.

Another object of the present invention is to provide a novel apparatus and method for applying locking plugs of plastic material such as nylon to threaded articles such as nuts or bolts.

A further object of the present invention is to provide an apparatus including a mandrel having a substantially flat guide surface thereon on which the threaded nut is mounted for drilling a shallow blind recess in the inner periphery of the threaded nut and for inserting a cylindrical plastic plug in the recess across the flat guide surface to form a friction lock with the threads of a counterpart member.

Still another object of the present invention is to provide a method of making a friction lock nut in which a tapered or cylindrical mandrel is used to force the nylon plug into the drilled recess under very great pressure and to form the end face of the plug.

A further object of the present invention is to provide a friction lock nut of the aforementioned type in which the resultant torque is controlled by the depth to which a conical mandrel is inserted in the nut.

Another object of the present invention is to provide a method of making a friction lock nut which utilizes a small sharp pin on the end of the plunger which picks up the cut plug of nylon, pushes it through the tapered sleeve, and transports the pellet or plug across an open space and then across the guide surface or surfaces provided on the mandrel into the drilled recess in the nut.

It is another object of this invention to provide a simplified low cost method and apparatus of the aforementioned types having certain advantages contributing to efficiency, reliability and long life as well as ease of maintenance.

These and other objects will become apparent as the description proceeds, especially when taken in connection with the accompanying drawing, wherein.

Figures 1, 2, 3, 4, 5, 6, 7, 8, 9, 10, 11:
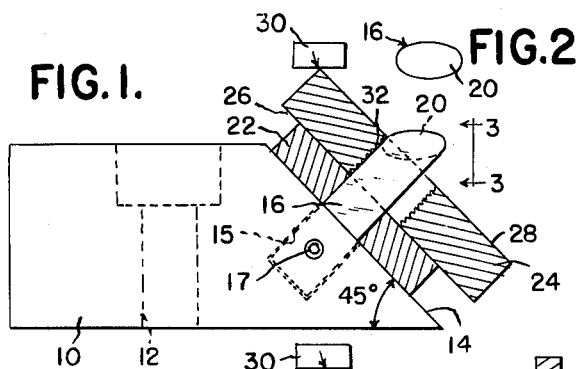
FIGURE 1 is a vertical view partly in section of the apparatus for making a threaded nut.
FIGURE 2 is a plan view of the mandrel illustrated in FIGURE 1.
FIGURE 3 is a partial side elevation of the mandrel illustrated in FIGURE 1 looking in the direction of arrows 3—3.
FIGURE 4 is an elevational view illustrating the manner in which the blind recess is provided in the nut by the drilling operation.
FIGURE 5 is an elevational view partly in section showing the manner in which the plastic plug is moved across the guide surface in the mandrel and inserted in the recess provided in the nut.
FIGURE 6 is a view illustrating the pointed tip on the end of the plunger which is adapted to pick up the cut plastic plug and insert it into the recess provided in the nut.
FIGURE 7 illustrates the manner in which a tapered mandrel is employed to force the plastic plug into the blind recess of the nut thereby completely filling the recess, and to provide the inwardly facing end surface of the plug with a shape of approximately concave cylindrical formation.
FIGURE 8 is a fragmentary view of the friction lock nut showing the plug in an assembled position.
FIGURE 9 is a partial elevational view of the friction lock nut looking to the left in FIGURE 8.
FIGURE 10 is a partial side elevation of a modified form of mandrel showing the guide surfaces provided thereon.
FIGURE 11 is a plan view of the mandrel illustrated in FIGURE 10.

Referring now to the drawings, the fixture is designated by the numeral 10 and is adapted to be connected to a rotatable support surface or the like of a machine, not shown, by means of a pair of bolts which are adapted to be inserted in the openings 12. The fixture 10 has a mounting surface 14 located at an angle of approximately 45° with respect to the support. The surface 14 is provided with a recess 15 of circular cross-section which has its longitudinal axis substantially perpendicular to the support surface 14. A mandrel 16, in the form of a cylinder, has one end portion received in the recess 15 and the other end portion extends outwardly from the mounting surface 14. The mandrel 16 has its axis substantially perpendicular to the support surface 14 as best illustrated in FIGURE 1. An adjustable set screw 17 or the like is carried by the fixture 10 and is engageable with the mandrel 16 so as to hold it in a fixed position in the fixture 10.

The mandrel 16 is cylindrical and has a diameter which is preferably substantially less than the threaded openings provided in the nut 24. The mandrel 16 is provided on the outer end thereof with a substantially flat open unobstructed guide surface 20, as best illustrated in FIGURE 3. The mandrel 16 is made from tungsten carbide material. As best illustrated in FIGURE 3, the guide surface 20 is beveled or laterally inclined at approximately 20° with respect to a horizontal plane to oppose the resultant lateral forces on the drill bit 36 as a result of the drilling operation which will be subsequently described. A spacer 22 is mounted on the lower end of the mandrel 16 adjacent to the support surface 14. In the event the end surface 20 of the mandrel 16 should wear, as will be subsequently explained, the screw 17 may be adjusted so as to reposition mandrel 16 in the recess 15 so as to maintain surface 20 in the same position with respect to the drill 36.

In operation, a nut 24 is mounted on the mandrel 16 in such a manner that the sides 26 and 28 thereof are substantially parallel to the mounting surface 14. Clamping means 30 are provided for urging the threads 32 on one side of the nut 24 against one side of the mandrel 16 as illustrated. After the nut 24 has been mounted in the position illustrated in FIGURE 1 with the clamping means 30 positioned so as to hold the nut 24 against the mandrel 16, the fixture 10 is moved to a drilling station 33 provided on the machine as illustrated in FIGURE 4. The drilling station 33 includes a drill 34 having a drill bit 36 and a drill guide 38 which includes a tapered passage 40. At the drilling station 33, the drill bit 36 is moved across the flat guide surface 20 provided on the outer end of the mandrel 16 into the wall of the nut 24 so as to drill the recess 40 to the requisite depth. The guide surface 20 includes a portion parallel to the axis of the drill bit 36, with the surface 20 being substantially flat and laterally inclined to oppose the resultant lateral forces on the drill bit 36 as a result of the drilling operation.

After the nut 24 has been recessed, the fixture 10 is rotated to the plugging station 42 as illustrated in FIGURE 5. A mechanism for cutting the plug from plastic material is described in my U. S. Patent 2,980,928. The mechanism includes generally a tubular cutter, not illustrated, the forward end of which is tapered, and which terminates in a sharp cutting edge. The cutter is generally slidably received in a bushing which at its forward end receives a guide member 50 having an opening 52 therein of a size to receive a cut plug or disc 58 of plastic material, such as nylon, as it is advanced therethrough. The plugging station 42 further includes a plunger 54 having at the forward end thereof a relatively small pin 56 which is adapted to pick up the cut plug 58 and move it through the tapered passage 52. The plunger 54 is further moved to the left as viewed in FIGURE 5 so as to move the plastic plug 58 across the guide surface 20 provided on the mandrel 16 into press-fit engagement with the recess 40 provided in the nut 24.

After the plug 58 has been inserted in the recess 40 of the nut 24, the nut 24 is removed from the mandrel 16. The nut 24 is then retained in an appropriate fixed position opposite a mandrel 60 which may be tapered or cylindrical. As illustrated the mandrel 60 has a tapered end 61. The tapered mandrel 60 is moved through the bore of the nut 24 so as to move the plug 58 into the recess 40 to completely fill the recess 40 and to provide a permanent shape to the inwardly facing projecting portion 62 of the plug 58 as a result of the pressure applied by the mandrel 60. In other words, the inwardly facing end surface of the plug 58 will be approximately of concave cylindrical formation. The important use of the mandrel 60 is that it results in forcing the nylon plug 58 into the drilled recess 40 under very great pressure thereby eliminating the void at the bottom of the recess 40 and simultaneously shaping the inwardly facing end surface of the plug. By utilizing the method of the present invention it has been found that the very great pressure created by the mandrel is effective to overcome the plastic memory of the plastic plug 58. With such a construction the nut 24 of the present invention has considerably more heat resistance than prior art constructions. In heat applications, the nylon plug 58 softens so that migration under heat, if any, is radially outwardly of the recess 40, thus causing more protrusion of the nylon material.

It is recognized in the art that the highest torque results from nylon which is smeared away from the drilled recess and compressed between threads of the screw and nut while it remains physically attached to the part of the nylon in the recess.

The present invention has overcome an important problem by providing a small sharp pin 56 on the end of the plunger 54 which actually picks up the cut pellet or plug of nylon, pushes it through the tapered sleeve 50 and transports it across an open space and then across the guide surface 20 provided on the mandrel 16 into the drilled recess 40 provided in the nut 24.

Referring now to FIGURES 8 and 9, an enlargement of part of the finished nut 24 is shown. It should be noted that the sides of the plastic pellet or plug 58 which extend into the bore of the nut 24 are at approximately a 45° angle with respect to the axis of the nut 24. This is an important advantage over prior art constructions since either side of the plug 58 will present the same angle to the approaching end of a screw or bolt independently of which side of the nut 24 is used.

The mandrel 60 not only eliminates the void at the bottom of the recess 40 but also provides a permanent shape to the inwardly facing end of the plug 58 as a result of the pressure applied by the mandrel. The resultant torque permitted on the plug 58 may be controlled by the depth to which the mandrel 60 is inserted into the recess of the nut 24 or by the size of the mandrel utilized.

While the present invention has been heretofore primarily discussed with reference to one side of the plug making an angle of approximately 45°, it has been found that a range of 35°–55° is suitable for many applications. In such instances, the slope of the mounting surface 14 would equal the requisite angle of the side of the plug.

FIGURES 10 and 11 illustrate a modified mandrel 66 which is of cylindrical configuration. The outer end of the mandrel is notched to provide a pair of perpendicularly arranged guide surfaces 68 and 70. The mandrel 66 is made from tungsten carbide and is utilized with the apparatus 10 in place of the mandrel 16. When the drill 36 is moved across the mandrel 66, it is guided by surfaces 68 and 70. The illustrated shape of the notch or opening, including the guide surfaces 68 and 70, is sufficient because of the angle between the drill and nut and offers the advantages of ready chip clearance, oil flow, and also prevents an interlock between the projecting portion of the inserted nylon plug 58 and a completely cylindrical drill guide. The notch or opening in the mandrel 66, defined by the guide surfaces 68 and 70, also forms a passage or conduit through which the cut nylon pellet or plug 58 is inserted into the recessed nut 24.

Each mandrel 16 or 66 serves three important functions. First of all, the mandrel provides a support for the nut 24 as illustrated in FIGURE 1. Secondly, the outer end of the mandrel is provided with a guide surface 20 or surfaces 68 and 70 for supporting and guiding the drill 36 during the drilling operation as illustrated in FIGURE 4. Thirdly, the support surface 20 or surfaces 68 and 70 on the mandrel supports the pellet or plug 58 as it is advanced across the mandrel into the recess opening 40 in the nut 24 as illustrated in FIGURE 5.

The mandrel 16 and the mandrel 66 are both made from tungsten carbide material. The mandrel 16 has certain advantages over the mandrel 66 in that the outer end surface is easier to machine. In other words, it is easier to machine the inclined sloping or beveled end 20 on the mandrel 16 than it is to machine the notch in the mandrel 66. In addition, the effective support area of the flat end surface 20 of mandrel 16 is substantially greater than the effective support area of the notch in mandrel 66 such that a greater force may be applied by the drill 36 to the end surface of the mandrel 16 than to the surfaces 68 and 70 of mandrel 66 without damaging the mandrel.

In use, the end surface 20 of the mandrel 16 will wear due to the drilling operation so as to form a shallow groove therein. At such time the mandrel 16 is removed from the fixture 10 by loosening the set screw 17. Thereafter, the end surface 20 is refinished by a machining operation so as to again provide a flat beveled surface. Later on the mandrel 16 is reinserted in the recess 15 and the set screw 17 adjusted so that the flat end surface 20 thereof has the same relative position with respect to the drill 36 and the plunger 54.

It has been found that when the surfaces 68 and 70 of mandrel 66 have worn it is more difficult to refinish said surfaces than is the case with mandrel 16. Also, in use the notch on mandrel 66 tends to crumble or break away and it is necessary in many cases to replace worn mandrel 66 with another mandrel.

The mandrel 16 may be refinished a far greater number of times than mandrel 66. Thus it is more advantageous to use mandrel 16 so as to effect savings in material, costs, and labor.

The drawing and the foregoing specification constitute a description of the improved method and apparatus for making a friction nut in such full, clear, concise and exact terms as to enable any person skilled in the art to practice the invention, the scope of which is indicated by the appended claims.

What I claim as my invention is:

1. Mechanism for drilling an opening in a nut provided with a bore having an axis and having the inner wall thereof threaded comprising a drilling tool, means for mounting the drilling tool for axial movement along an axis extending through one end of the bore and intersecting the threaded inner wall thereof, means for supporting the nut firmly against displacement, a fixture having a laterally open unobstructed guide surface which extends into said one end of the bore of the nut and substantially intersects the threaded inner wall thereof, and means for moving said drilling tool across and in contact with said laterally open unobstructed guide surface transversely through the bore of the nut and into the threaded inner wall of the nut to form an opening therein which intersects the bore and the projection of which extends outwardly through said one end of the bore, said guide surface supporting said drilling tool against lateral forces and guiding said tool during axial movement thereof, said guide surface also providing for the unobstructed flow of oil and for ready clearance of the chips from the drilled recess.

2. The mechanism defined in claim 1 wherein said fixture comprises a base, an adjustable and replaceable mandrel, and means for adjustably connecting said mandrel on one end thereof to said base, said open unobstructed guide surface being located on the other end of said mandrel and adapted to be refinished after wear, said means for supporting the nut including said mandrel.

3. The mechanism defined in claim 2 wherein the open unobstructed guide surface on said mandrel is substantially flat.

4. The mechanism defined is claim 2 wherein the open unobstructed guide surface on said mandrel comprises a pair of insersecting surface portions constructed and arranged at approximately 90°.

5. The mechanism defined in claim 2 wherein said mandrel is of circular cross-section and is inclined upwardly from said base at an oblique angle, said guide surface having one element thereof parallel to the axis of said drill and being laterally inclined to oppose the resultant lateral forces on said drill as a result of the drilling operation.

6. Mechanism for applying a solid deformable plug to a nut provided with an internally threaded bore having a longitudinally extending axis and a laterally extending blind recess in the inner wall thereof comprising means for supporting the nut firmly against displacement, a fixture having an open unobstructed guide surface which extends into one end of the bore of the nut and substantially intersects the open end of the blind recess, a guide positioned adjacent said guide surface, said guide including a guide passage which is opposite and axially aligned with the recess and said guide surface, a plunger having a sharp pin on the leading end thereof and mounted for axial movement through said guide, and means for advancing the pin of the plunger against a deformable plug in alignment with the guide passage to cause the pin to penetrate the plug and to force the plug through the guide passage and thereafter carry the plug across said guide surface transversely through the bore of the nut and press the plug into the blind recess of the nut.

7. The mechanism defined in claim 6 wherein said fixture comprises a base, an adjustable and replaceable mandrel, and means for adjustably connecting said mandrel on one end thereof to said base, said open unobstructed guide surface being located on the other end of said mandrel and adapted to be refinished after wear, said means for supporting the nut including said mandrel.

8. The mechanism defined in claim 7 wherein the open unobstructed guide surface on said mandrel is substantially flat.

9. The mechanism defined in claim 7 wherein the open unobstructed guide surface on said mandrel comprises a pair of intersecting surface portions constructed and arranged at approximately 90°.

10. An apparatus for making a friction lock nut having an internally threaded bore comprising a base having a bottom surface and a support surface on one side thereof which is inclined with respect to said bottom surface, an elongated mandrel, means for connecting said mandrel to said base for adjustment longitudinally, said mandrel extending in an upwardly direction from said support surface and terminating in an open unobstructed substantially flat guide surface which is adapted to be refinished after wear, means for supporting an internally threaded nut firmly against displacement on said mandrel and with a side of said nut against said inclined support surface, with a threaded portion thereof in engagement with said mandrel and directly opposite said guide surface, said guide surface extending into one end of the bore of the nut and substantially intersecting the threaded inner wall thereof, a drilling tool, means for mounting said drilling tool for axial movement along a substantially horizontal axis extending through said one end of the bore of the nut and intersecting the threaded inner wall thereof, means for urging said drilling tool across said guide surface for support thereby and into the threaded wall of the nut to form a blind recess therein which is inclined with respect to the axis of the nut and the projection of which extends outwardly through said one end of the bore, a plunger, means for mounting said plunger for axial movement along a substantially horizontal axis extending through said one end of the bore of the nut and intersecting the drilled recess, and means for advancing said plunger against a plug of deformable material and thereafter advancing the plug and plunger across said guide surface to press the plug into the blind recess of the nut.

11. The apparatus defined in claim 10 wherein said plunger has a sharp pin on the leading end thereof which picks up the plug and carries it across the guide surface into the blind recess of the nut.

12. The apparatus defined in claim 10 wherein said support surface is inclined at an angle in the range of 35°–55° with respect to said bottom surface.

13. The method of making a self-locking threaded element having a longitudinally extending axis and a laterally extending blind recess in a wall thereof which comprises inserting a plug of deformable material into said recess under sufficient force to partially fill the recess with a portion of the plug extending beyond the open end of the recess, and finally moving a finishing mandrel in a direction substantially parallel to the axis of the element to result in a force on the outer surface of the plug, the component of the force parallel to the axis of the recess increasing as the mandrel is advanced to cause flow of the material in a direction away from the mandrel until the blind recess is substantially filled and the plug is interlocked in the recess, the plug being of sufficient volume to extend outwardly beyond the open end of the recess, with the outer surface of the plug being shaped by the mandrel upon the aforesaid advancement of the mandrel.

14. The method of making a self-locking threaded element having a longitudinally extending axis which comprises forming a laterally extending blind recess in a wall thereof, thereafter inserting a plug of deformable material into said recess under sufficient force to partially fill the recess with a portion of the plug extending beyond the open end of the recess, and finally moving a finishing mandrel of varying increasing depth from front to rear thereof in a direction substantially parallel to the axis of the element to result in a force on the outer surface of the plug, the component of the force parallel to the axis of the recess increasing as the mandrel is advanced to cause flow of the material in a direction away from the mandrel until the blind recess is substantially filled and the plug is interlocked in the recess, the plug being of sufficient volume to extend outwardly beyond the open end of the recess, with the outer surface of the plug being shaped by the mandrel upon the aforesaid advancement of the mandrel.

15. The method of making a friction lock nut provided with an internally threaded bore and having a longitudinally extending axis comprising forming a blind recess in the interior wall of the nut extending from the bore through the threads thereof a part of the distance only through the wall at an angle with respect to the axis of the bore, thereafter inserting a plug of deformable material into said recess under sufficient force to partially fill the recess with a portion of the plug extending beyond the open end of the recess into the bore, and finally moving a finishing mandrel of varying increasing depth from front to rear thereof in a direction substantially parallel to the axis of and through the bore of the nut to result in a force on the outer surface of the plug, the component of the force parallel to the axis of the recess increasing as the mandrel is advanced to cause flow of the material in a direction away from the mandrel until the blind recess is substantially filled and the plug is interlocked in the recess, the plug being of sufficient volume to extend outwardly beyond the open end of the recess into the bore, with the outer surface of the plug being shaped by the mandrel upon the aforesaid advancement of the mandrel.

16. The method as defined in claim 15 which comprises inserting the plug in the recess with a plunger having a small sharp pin thereon which engages the plug.

17. The method of making a friction lock nut which is provided with an internally threaded bore and having a longitudinally extending axis and having a blind recess in the interior wall thereof extending from the internally threaded bore a part of the distance only through the wall at an angle comprising inserting a plug of deformable material into said recess under sufficient force to partially fill the blind recess with a portion of the plug extending beyond the open end of the recess, and finally moving a finishing mandrel in a direction substantially parallel to the axis of the nut to result in a force on the outer surface of the plug, the component of the force parallel to the axis of the recess increasing as the mandrel is advanced to cause flow of the material in a direction away from the mandrel until the blind recess is substantially filled and the plug is interlocked in the recess, the plug being of sufficient volume to extend outwardly beyond the open end of the recess into the bore, with the outer surface of the plug being shaped by the mandrel upon the aforesaid advancement of the mandrel.

18. The method of making a fastening element having in a wall thereof a blind recess having an axis extending transversely of said wall which comprises inserting a plug of deformable material into said recess under sufficient force to partially fill the recess, with a portion of the plug extending beyond the open end of the recess, and finally moving a wedging element in a direction which is transverse to the axis of the recess and thereby applying a force on the outer surface of the plug of sufficient magnitude to cause flow of the material in a direction away from the wedging element toward the bottom surface of the recess until the blind recess is substantially completely filled and the plug is interlocked in the recess, the plug being of sufficient volume to extend outwardly beyond the open end of the recess.

19. The method of making a fastening element having in a wall thereof a blind recess having an axis extending transversely of said wall and provided with a concave conical bottom surface which comprises inserting a plug of deformable material into said recess under sufficient force to partially fill the recess, with a portion of the plug extending beyond the open end of the recess, and finally moving a wedging element in a direction which is transverse to the axis of the recess and thereby applying a force on the outer surface of the plug of sufficient magnitude to cause flow of the material in a direction away from the wedging element toward the bottom surface of the recess until the blind recess is substantially completely filled and the plug is interlocked in the recess, with the force being of sufficient magnitude to substantially conform the inner end of the plug to the shape of the bottom surface of the recess, the plug being of sufficient volume to extend outwardly beyond the open end of the recess.

20. The method of making a fastening element having in a wall thereof a blind recess having an axis extending transversely of said wall which comprises inserting a plug of deformable plastic material into said recess under sufficient force to partially fill the recess, with a portion of the plug extending beyond the open end of the recess, moving a wedging element which is transversely convexly curved in a direction which is transverse to the axis of the recess and thereby applying a force on the outer surface of the plug of sufficient magnitude to cause flow of the material in a direction away from the wedging element toward the bottom surface of the recess until the blind recess is substantially completely filled and the plug is interlocked in the recess, the plug being of sufficient volume to extend outwardly beyond the open end of the recess, and permanently deforming the outer end of the plug to a concave shape corresponding to the convex curvature of the wedging element by the application of force of sufficient magnitude to overcome plastic memory of the material.

21. The method of making a friction lock nut having an integral peripheral wall and an internally screw threaded bore having an axis, with the peripheral wall having therein a blind recess extending from the bore through the threads and partly through the wall, the recess having an axis extending at an oblique angle to the axis of the bore and extending out through the opening at one end of the nut, which comprises inserting a plug of deformable plastic material into said recess under sufficient force to partially fill the recess, with a portion of the plug extending beyond the open end of the recess, moving a wedging element which is transversely convexly curved through the bore of the nut and thereby applying a force on the outer surface of the plug of sufficient magnitude to cause flow of the material in a direction away from the wedging element toward the bottom surface of the recess until the blind recess is substantially completely filled and the plug is interlocked in the recess, the plug being of sufficient volume to extend outwardly beyond the open end of the recess, and permanently deforming the outer end of said plug to a concave shape corresponding to the convex curvature of the mandrel by the application of force of sufficient magnitude to overcome plastic memory of the material.

22. The method of claim 21 in which said wedging element is tapered and which comprises moving the element axially in the bore of the nut in a direction through said one end toward the other end of the nut.

References Cited by the Examiner

UNITED STATES PATENTS

| 245,410 | 8/81 | Sheldon | 221—214 |
| 2,119,420 | 5/38 | Crawley | 77—62 |
| 2,520,121 | 8/50 | Brutus | 151—7 |
| 2,520,122 | 8/50 | Brutus | 29—451 |
| 2,779,038 | 1/57 | MacBlane et al. | |

ANDREW R. JUHASZ, *Primary Examiner.*